(12) United States Patent
Zhang et al.

(10) Patent No.: US 7,965,668 B2
(45) Date of Patent: *Jun. 21, 2011

(54) METHOD AND SYSTEM FOR PRIORITY-BASED STATE TRANSITION FOR HIGH SPEED DATA TRANSMISSION AND WIRELESS ACCESS NETWORKS

(75) Inventors: Hang Zhang, Nepean (CA); Mo-Han Fong, L'Orignal (CA); Sophie Vrzic, Nepean (CA); Derek K. Yu, Kanata (CA)

(73) Assignee: Ericsson AB, Stockholm (SE)

( * ) Notice: Subject to any disclaimer, the term of this patent is extended or adjusted under 35 U.S.C. 154(b) by 14 days.

This patent is subject to a terminal disclaimer.

(21) Appl. No.: 12/243,501

(22) Filed: Oct. 1, 2008

(65) Prior Publication Data

US 2009/0023468 A1  Jan. 22, 2009

Related U.S. Application Data

(63) Continuation of application No. 10/346,077, filed on Jan. 17, 2003, now Pat. No. 7,508,780.

(60) Provisional application No. 60/349,518, filed on Jan. 18, 2002.

(51) Int. Cl.
*G08C 17/00* (2006.01)
(52) U.S. Cl. ........................ 370/311; 370/450
(58) Field of Classification Search .................. 370/127, 370/311, 318, 328, 329, 348, 395.42, 443, 370/450, 459, 572, 574; 455/115, 127.1, 455/414, 414.1, 512; 713/300, 323
See application file for complete search history.

(56) References Cited

U.S. PATENT DOCUMENTS

| | | | | |
|---|---|---|---|---|
| 4,809,164 A | * | 2/1989 | Fuller | 710/41 |
| 5,666,655 A | * | 9/1997 | Ishikawa et al. | 455/512 |
| 5,914,950 A | * | 6/1999 | Tiedemann et al. | 370/348 |
| 6,192,234 B1 | * | 2/2001 | Chavez, Jr. | 455/414.1 |
| 6,226,277 B1 | * | 5/2001 | Chuah | 370/328 |
| 6,400,699 B1 | * | 6/2002 | Airy et al. | 370/329 |
| 6,463,044 B1 | * | 10/2002 | Seo | 370/329 |
| 7,508,780 B2 | * | 3/2009 | Zhang et al. | 370/311 |
| 2001/0049275 A1 | * | 12/2001 | Pierry et al. | 455/414 |
| 2002/0075823 A1 | * | 6/2002 | Lee et al. | 370/328 |
| 2002/0110129 A1 | * | 8/2002 | Matsuoka et al. | 370/395.42 |
| 2003/0035434 A1 | * | 2/2003 | Le et al. | 370/443 |

FOREIGN PATENT DOCUMENTS

| | | |
|---|---|---|
| EP | 1 148 749 | 8/2000 |
| WO | WO 99/52306 | 3/1999 |
| WO | WO 99/57925 | 4/1999 |
| WO | WO 01/52588 | 1/2001 |

* cited by examiner

*Primary Examiner* — Andrew Lai

(57) ABSTRACT

Apparatus and methods are provided for transitioning wireless devices between a plurality of states having increasing resource intensity from a least resource intensive state to a most resource intensive second state. All power-on wireless devices are ranked. A respective subset of the power-on wireless devices is assigned to each state, the power-on wireless devices of the subsets having rankings which increase with resource intensity of the state. Signalling is generated to the wireless devices to instruct them to implement any change in state. The priorities which are calculated for the purpose of state scheduling are preferably the same as those, or at least based upon the priorities used for packet scheduling.

18 Claims, 9 Drawing Sheets

METHOD AND SYSTEM FOR PRIORITY-BASED STATE TRANSITION FOR HIGH SPEED DATA TRANSMISSION AND WIRELESS ACCESS NETWORKS

RELATED APPLICATIONS

This application is a continuation of U.S. application Ser. No. 10/346,077, now U.S. Pat. No. 7,508,780, filed Jan. 17, 2003 and claims the benefit thereof, which itself claims the benefit of U.S. Provisional Application No. 60/349,518 filed Jan. 18, 2002, the contents of which are incorporated in its entirety herein by reference.

FIELD OF THE INVENTION

The invention relates to systems and methods for implementing state transitions for high speed data transmission in wireless access networks.

BACKGROUND OF THE INVENTION

Current wireless network designs provide for a shared high bandwidth forward channel from a base station to mobile stations for delivering high speed data services. Such a shared channel has been defined for example by wireless standards including 1xEV-DO, 1xEV-DV, MC-DV and UMTS/HSDPA.

In a wireless access network, all users that have acquired the system can be classified into two basic groups: active user group (active user pool) or dormant—user group (dormant user pool). For a user in the active state, it has all necessary dedicated resources allocated for sending and receiving data. Due to the limited resources of a wireless access system, the maximum number of active users supported is restricted to a certain number. All other users then have to be kept in the dormant state. In order to support more active users, some mechanism to allow more operational modes of active state have been proposed. One example is to allow three states—active, control-hold and dormant states. For a user operating on control-hold mode, less resources are consumed than by a user who is operating on active state. In the current 1xEV and UMTS proposals, one fat pipe (e.g., forward packet data channel) is designed for down link packet data transmission. All active mode user's data can be scheduled to be transmitted over the fat pipe. A packet scheduler decides which user's packet among all active mode users is selected to be transmitted based on a scheduling algorithm. A scheduling algorithm, by taking some input parameters, such as each mobile station's real time channel condition, packet deadline, minimum required data rate, fairness, etc., calculates the priority of each user. The user with the highest priority is selected and its packet is transmitted. Typically some mechanism is provided for deciding when to move an active user to a dormant state or vice versa, or to decide when to move a user between the active and the control-hold state. Currently available solutions for state transition control are mainly timer-based. For example, in a timer-based state transition system, for moving an active user out of its active state, a timer is set for an active state user upon its data buffer becoming empty. If some new data arrives before the expiration of the timer, the timer is then reset. Otherwise, the active user is moved from the active state pool at the expiration of this timer. For moving a dormant user to the active state, a FIFO (first-in, first-out) principle is typically employed.

The timer that is employed for such state transitions can be a fixed value (for example as used in 1xRTT) or it can be dynamically changed. The adaptation of the timer value may depend on traffic load, activity of a user's traffic, etc.

There are a number of problems with the above discussed solutions. For example, in respect of moving an active user out of active state, keeping a user with an empty data buffer in the active pool prevents a dormant user with a full data buffer from getting into the active state pool. Keeping an active user with lower scheduler priority in the active state pool may prevent dormant users with high scheduler priority from getting into the active state pool. These together may cause the system to have a higher outage rate and decrease the multiple user diversity gain. In consequence, the overall system throughput and capacity may drop.

For moving a dormant user into the active state, the simple FIFO principle may move a low priority user into the active state while keeping a dormant user with high priority outside the active state. This again may cause reduced system throughput.

In summary, the current state transition control methods are not optimal for packet switching services. This is because they were designed originally for circuit switching services. Lower overall system capacity is provided because more care is given to the users in the active state, and less fairness is given to support all registered users. System throughput in highly bursty traffic mixed cases will also be lower because the number of full-buffer active users is not high enough to provide sufficient multi-user diversity.

Referring to FIG. 1, shown as a very simple wireless network in which a single BTS (base station transceiver) 10 together with two mobile stations MS 12, MS 14. The forward channel 18 is a shared data channel which is transmitted by the BTS 10 to the mobile stations 12, 14, but at a given instant data is only sent to one of the two mobile stations using the shared data channel 18. Each mobile station feeds back information to the BTS 10 to enable it to make decisions as to which mobile station should receive access to the shared data channel at a given instant. In the illustrated example, channel 14 from MS 12 to BTS 10 sends C/I, pilot information and acknowledgement information for MS 12, and channel 16 sends C/I, pilot information and acknowledgement information for mobile station 14.

In conventional 2-state MAC systems, only active and dormant users are allowed. There is a maximum number of active users each of which are given a dedicated resource at full-rate.

In 3-state MAC systems, there is still the active state in which there is a maximum number of users each of which transmits on reverse channel at full-rate, and there is a control-hold state in which users transmit on the reverse channel at a reduced rate. Typically there would be a maximum number of control-hold users, and a dedicated resource is provided but at a gated rate. Finally there is the dormant state in which there is simply a common resource.

MAC state transitions control the allocation/release of dedicated resources, the assignment of full/gated-rate operation.

Referring again to FIG. 1, in the three state system, a mobile station in the dormant state would not send any C/I or pilot information back to the BTS. A mobile station in active state would generate these at the maximum defined rate. For example, these might be sent back to the BTS every 1.25 ms. Control-hold users would then send this information back to the BTS at a reduced rate, for example ¼ as often. This would result in the C/I, pilot being sent back every 5 ms for example. All of these signals sent back by the mobile station to the BTS generate interference for other users, and as such it is desirable to send them as infrequently as possible. Users in the active state generate the highest interference.

There are many different scheduler designs for deciding which user gets the access to the shared data channel 18. Schedulers make a choice between active users when scheduling the shared data channel. In the simplest example, the scheduler ranks all active users, and selects the top user for transmission on the shared data channel 18. Ranking is performed among active state users only. Schedulers do not consider users outside the active state.

SUMMARY OF THE INVENTION

According to one broad aspect, the invention provides a method of transitioning a plurality of wireless devices between a plurality of states having increasing resource intensity from a least resource intensive state to a most resource intensive second state comprising: ranking all power-on wireless devices; assigning a respective subset of the power-on wireless devices to each state, the power-on wireless devices of the subsets having rankings which increase with resource intensity of the state; and signalling to the wireless devices to instruct them to implement any change in state.

In some embodiments, the states are MAC (media access control) states.

In some embodiments, the MAC states comprise, in increasing order of resource intensity, Dormant, Control-Hold, and Active.

In some embodiments, a respective predetermined maximum number of wireless devices are allowed to be in at least one of the MAC states, and wherein the subsets are defined subject to these respective predetermined maximum numbers.

In some embodiments, a respective predetermined maximum number of wireless devices are allowed to be in the Control-Hold and Active MAC states, and wherein the subsets are defined subject to these respective predetermined maximum numbers.

In some embodiments, the method further comprises transmitting a shared channel to the wireless devices on an ongoing basis, scheduling wireless devices in the most resource intensive MAC state on a time division basis access to the shared channel.

In some embodiments, the method further comprises scheduling wireless devices by ranking all wireless devices in the most resource intensive MAC state, and at a given scheduling period scheduling the wireless device which is ranked highest.

In some embodiments, the ranking performed in scheduling wireless devices is substantially similar to the ranking performed in assigning MAC states.

In some embodiments, the ranking performed in scheduling wireless devices is substantially similar to the ranking performed in assigning MAC states in that short term parameters are used to determine rankings for scheduling, and corresponding long term parameters are used to determine rankings for assigning MAC states.

In some embodiments, the ranking is performed as a function of a selected data rate, an average throughput, a minimum required data rate, a minimum packet deadline, a buffer empty time, and a drop rate for each user.

In some embodiments, the method further comprises prior to assigning a respective subset of the power-on wireless devices to each MAC state, applying at least one constraint to re-organize the rankings.

In some embodiments, applying at least one constraint to re-organize the rankings comprises defining at least one state transition from a previous state to a new state which is not allowed to occur, and re-organizing the rankings to eliminate any such state transitions.

In some embodiments, the MAC states comprise, in increasing order of resource intensity, Dormant, Control-Hold, and Active, and the at least one state transition which is not allowed to occur is from dormant to control-hold.

In some embodiments, the MAC states comprise, in increasing order of resource intensity, Dormant, Control-Hold, and Active, and the at least one state transition which is not allowed to occur is from Active to Dormant for an Active wireless device with a full buffer and from Control-Hold to Dormant for a Control-Hold device with a full buffer.

In some embodiments, the method further involves ranking wireless devices having a full buffer above wireless devices having an empty buffer.

In some embodiments, the method involves for the purpose of state scheduling, treating a wireless device in the Active state or the Control-Hold state having a buffer empty time less than a buffer empty time threshold or satisfying some other constraint as though the wireless device had a full buffer.

In some embodiments, ranking all power-on wireless devices comprises: for at least one state, determining a state priority for each wireless device in the at least one state by filtering scheduling priorities determined for the wireless device; for at least one other state, for each wireless device in the at least one other state, determining a state priority for each wireless device without the use of scheduling priorities; ranking in order according to state priority all wireless devices with a full buffer to generate a first ranking; ranking in order according to state priority all wireless devices with an empty buffer to generate a second ranking; combining the first ranking with the second ranking with the first ranking above the second ranking.

In some embodiments, the method further comprises before generating said second ranking, scaling each state priority of a wireless device with an empty buffer by a quantity which generally decreases as a function of buffer empty time.

According to one broad aspect, the invention provides an apparatus adapted to control transitioning a plurality of wireless devices between a plurality of states having increasing resource intensity from a least resource intensive state to a most resource intensive second state comprising: a state scheduler adapted to: a) rank all power-on wireless devices; b) assign a respective subset of the power-on wireless devices to each state, the power-on wireless devices of the subsets having rankings which increase with resource intensity of the state; and c) signal to the wireless devices to instruct them to implement any change in state.

In some embodiments, the states are MAC (media access control) states.

In some embodiments, the MAC states comprise, in increasing order of resource intensity, Dormant, Control-Hold, and Active.

In some embodiments, an apparatus adapts to allow a respective predetermined maximum number of wireless devices to be in at least one of the MAC states, and wherein the subsets are defined subject to these respective predetermined maximum numbers.

In some embodiments, a respective predetermined maximum number of wireless devices are allowed to be in the Control-Hold and Active MAC states, and wherein the subsets are defined subject to these respective predetermined maximum numbers.

In some embodiments, an apparatus further comprises transmit circuitry adapted to transmit a shared channel to the wireless devices on an ongoing basis; and a packet scheduler adapted to schedule wireless devices in the most resource intensive MAC state on a time division basis access to the shared channel.

In some embodiments, the scheduler schedules wireless devices by ranking all wireless devices in the most resource intensive MAC state, and at a given scheduling period schedules the wireless device which is ranked highest.

In some embodiments, the ranking performed by the packet scheduler is substantially similar to the ranking performed by the state scheduler.

In some embodiments, the ranking performed by the packet scheduler is substantially similar to the ranking performed by the state scheduler in that short term parameters are used to determine rankings for scheduling, and corresponding long term parameters are used to determine rankings for assigning MAC states.

In some embodiments, the ranking is performed as a function of a selected data rate, an average throughput, a minimum required data rate, a minimum packet deadline, a buffer empty time, and a drop rate for each user.

In some embodiments, an apparatus further adapts to, prior to assigning a respective subset of the power-on wireless devices to each MAC state, apply at least one constraint to re-organize the rankings.

In some embodiments, applying at least one constraint to re-organize the rankings comprises defining at least one state transition from a previous state to a new state which is not allowed to occur, and re-organizing the rankings to eliminate any such state transitions.

In some embodiments, the MAC states comprise, in increasing order of resource intensity, Dormant, Control-Hold, and Active, and the at least one state transition which is not allowed to occur is from dormant to control-hold.

In some embodiments, the MAC states comprise, in increasing order of resource intensity, Dormant, Control-Hold, and Active, and the at least one state transition which is not allowed to occur is from Active to Dormant for an active wireless device with a full buffer and from Control-Hold to Dormant for a Control-Hold device with a full buffer.

In some embodiments, the state scheduler is adapted to rank all power-on wireless devices by: for at least one state, determining a state priority for each wireless device in the at least one state by filtering scheduling priorities determined for the wireless device; for at least one other state, for each wireless device in the at least one other state, determining a state priority for each wireless device without the use of scheduling priorities; ranking in order according to state priority all wireless devices with a full buffer to generate a first ranking; ranking in order according to state priority all wireless devices with an empty buffer to generate a second ranking; combining the first ranking with the second ranking with the first ranking above the second ranking.

In some embodiments, the state scheduler is further adapted to, before generating said second ranking, scaling each state priority of a wireless device with an empty buffer by a quantity which generally decreases as a function of buffer empty time.

In some embodiments, an apparatus comprises a base station.

According to another broad aspect, the invention provides an apparatus for transitioning a plurality of wireless devices between a plurality of states having increasing resource intensity from a least resource intensive state to a most resource intensive second state comprising: means for ranking all power-on wireless devices; means for assigning a respective subset of the power-on wireless devices to each state, the power-on wireless devices of the subsets having rankings which increase with resource intensity of the state; and means for signalling to the wireless devices to instruct them to implement any change in state.

According to another broad aspect, the invention provides a processing platform readable medium having code stored thereon for execution by a processing platform, for, when executed transitioning a plurality of wireless devices between a plurality of states having increasing resource intensity from a least resource intensive state to a most resource intensive second state, the processing platform readable comprising: code means for ranking all power-on wireless devices; code means for assigning a respective subset of the power-on wireless devices to each state, the power-on wireless devices of the subsets having rankings which increase with resource intensity of the state; and code means for generating signalling messages to be transmitted to the wireless devices to instruct them to implement any change in state.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
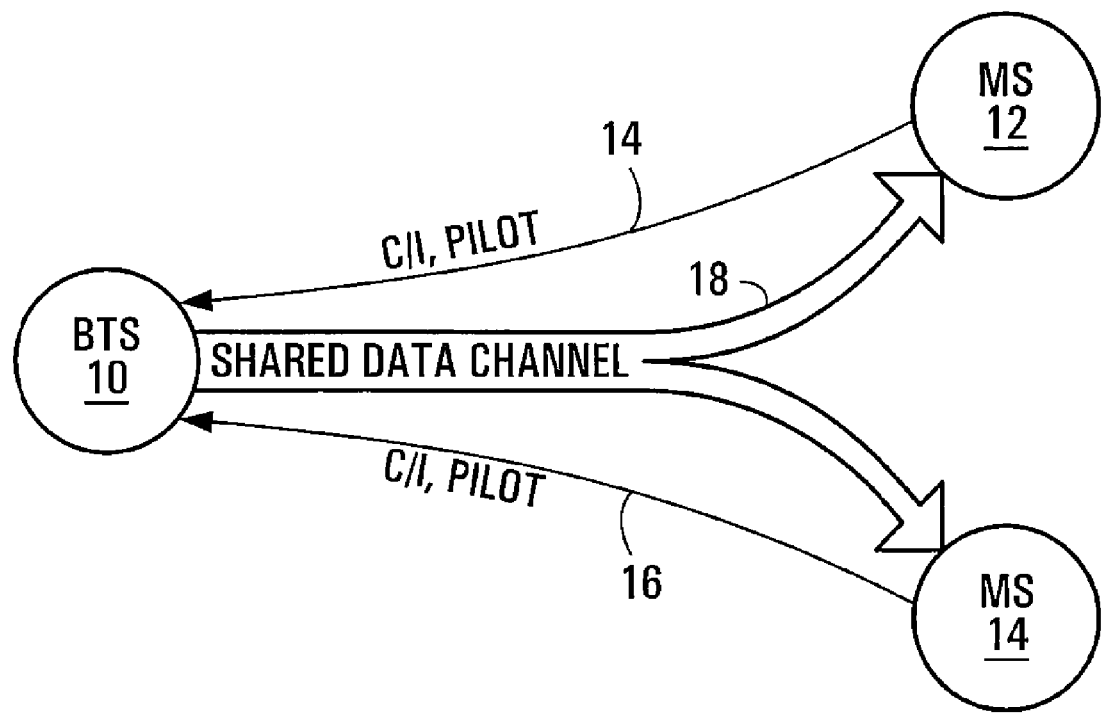
FIG. 1 is a schematic diagram of a very simple wireless network having a shared data channel from a base station to multiple mobile stations.
Figure 2:
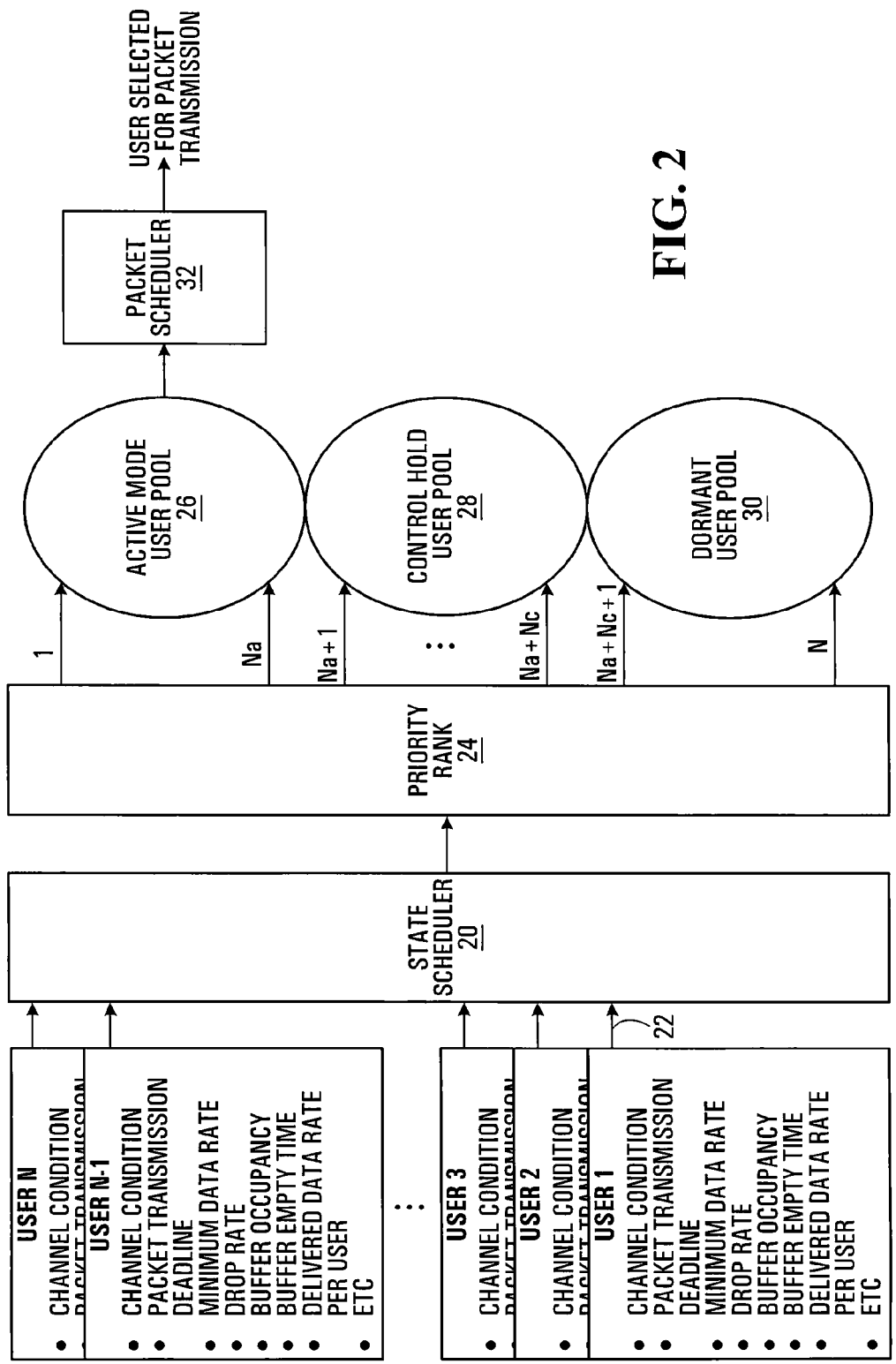
FIG. 2 is a block diagram of a state scheduler provided by an embodiment of the invention.

Referring now to FIG. 2, shown is a priority-based state scheduler provided by an embodiment of the invention. This might for example be implemented within a base station transceiver such as BTS 10 of FIG. 1.

This state scheduler is generally indicated at 20, and has a set of inputs for each user/mobile station to be state scheduled and ultimately defines an active mode user pool 26 which is used by a scheduler 32. In the illustrated example, the input 22 for "user 1" is shown to include channel conditions, packet transmission deadline, minimum data rate, drop rate, buffer occupancy, buffer empty time, delivered data rate per user. These are very specific input parameters which are included for the purpose of illustration only. Additional parameters may also be in employed and/or completely different parameters. A set of inputs is shown for each user in the system. In the illustrated example, it is assumed that there are N users. The input parameters may be actively passed to the state scheduler 20, or alternatively and/or in combination, the state scheduler may simply access stored data for each user. Typically, the state scheduler would be implemented as a combination of software and processing hardware. For example, this could be implemented in an ASIC, a general purpose processor with software, an FPGA, DSP, etc.

The state scheduler 20 processes the data received in respect of each of the users and performs a priority ranking of the users. The actual priority ranking is discussed in further detail below. The users that are prioritized at the top, for example the first Na users, are then assigned the most resource intensive state, for example in the illustrated example the previously described "active state". Similarly, the next highest prioritized group of users, for example users prioritized from rank Na+1 to Na+Nc, would be assigned the next most resource intensive MAC state, for example previously described "control-hold" state. The remaining users, namely those ranked from Na+Nc+1 through to user N are assigned the least resource intensive state, for example the previously described "dormant" state. FIG. 2 shows the priority ranking produced by the state scheduler generally indicated by 24, and shows the active mode user pool 26, a control-hold user pool 28, and a dormant user pool 30. The base station with MAC layer protocol includes messaging which is designed to inform users of changes in their state. For example, a user transitioning from control-hold to active mode would be informed of this change. Such messaging is conventional and will not be described in detail here.

Referring again to FIG. 2, after state scheduling has been performed by the state scheduler, and the priority ranking and state updating completed, the active mode user pool 26 alone is used by the packet scheduler 32. Packet scheduling can proceed as in conventional systems without the need for any change. However, as discussed previously, the packet scheduler typically does perform a prioritization algorithm of its own in determining which user is to be selected for packet transmission. In a preferred embodiment of the invention, the state scheduler 20 employs a priority algorithm which is similar to in as many respects as possible the prioritization algorithm employed by the packet scheduler 32.

It is noted that the rate of update of states implemented by the state scheduler 20 would typically be substantially slower than the rate of prioritization and packet scheduling by the packet scheduler 32. For example, where packet scheduling might be performed by the packet scheduler every 1.25 ms, it may only be necessary to update the states of each of the users every 100 scheduling periods, i.e. every 0.125 s. For this reason, it is not possible for the state scheduler 20 to perform identically to the packet scheduler 32. The state scheduler 20 necessarily has to operate on different information than the packet scheduler 32. In a preferred embodiment, where the packet scheduler 32 may perform prioritization on the basis of real-time or short-term data, for a given parameter, for example real-time C/I, the state scheduler employs long-term statistics, for example filtered C/I. The state scheduler 20 can use identical equations but employs filtered or long-term values instead of real-time or short-term values for example.

Figure 3:
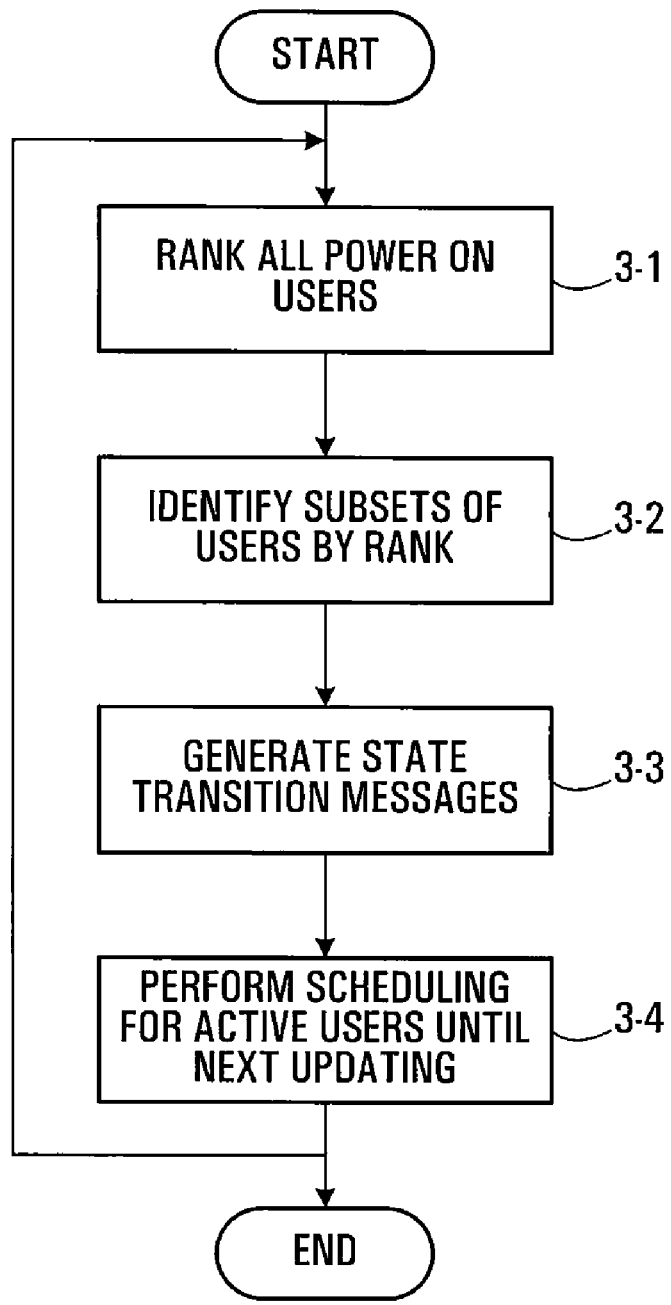
FIG. 3 is a flowchart of the functionality implemented by the state scheduler of FIG. 2.

The embodiment shown in FIG. 2 assumes three MAC layer states. FIG. 3 is a flowchart of the state scheduling in its most simple implementation, namely when there are only two MAC layer states. The method begins at step 3-1 with the ranking of all power on users. Next, at step 3-2, subsets of power-on users are identified according to rank for the number of different states. At step 3-3, layer 2 or layer 3 state transition messages are generated and transmitted such that the required state transitions are actually implemented in the mobile stations. Finally, at step 3-4, packet scheduling is performed for active users until the next update of the states.

As an example of a state scheduler priority algorithm, the following equation may be employed:

$$P_i = f(r_{selected\_i}, T_i, \bar{r}_i^*, D_i, E_i, d_{r,i})$$

where $r_{selected\_i}$ is the selected data rate for user i based on C/I, $T_i$ is the average data rate for user i, $\bar{r}_i^*$ is the minimum required data rate for user i, $D_i$ is the minimum packet deadline for user i, $E_i$ is the data buffer empty time for user i, $d_{r,i}$ is the drop rate for user i, and $P_i$ is the calculated priority for user i.

If some parameters are not available for users in a certain state, a constant value is used then. For example, the channel condition for a dormant user is not available, and a constant value, e.g., 0 dB is used.

As discussed above, certain parameters may not be available for one or more of the states and as such constant values may be assigned. Alternatively, different equations may be employed for users in different states.

Figure 4:
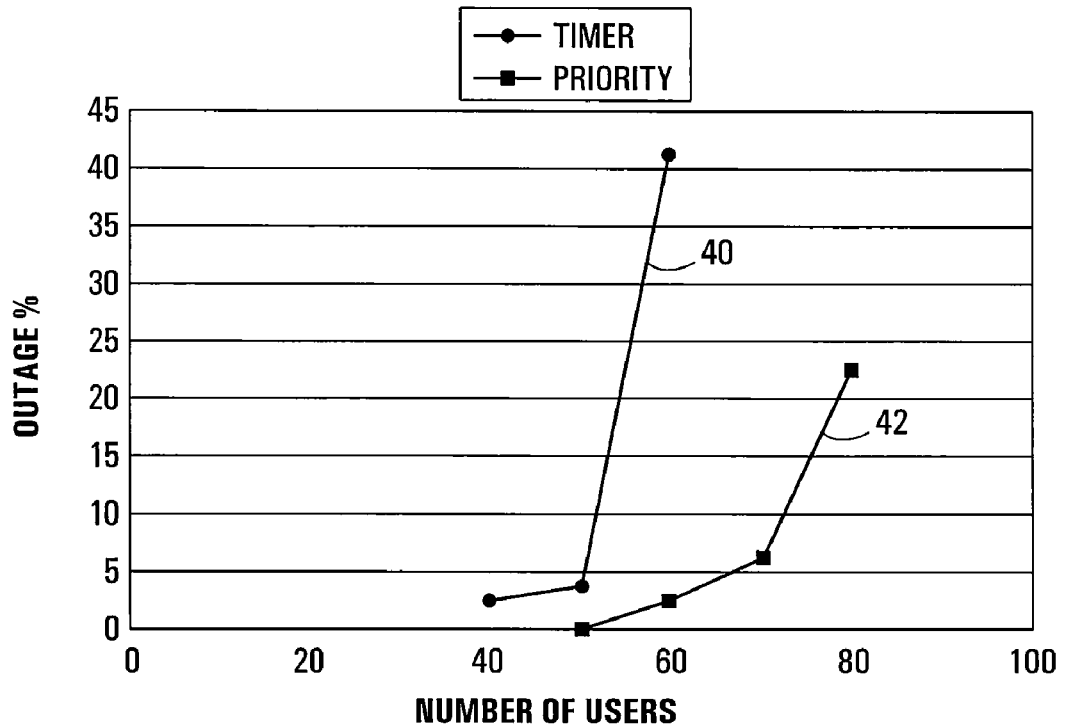
FIGS. 4 and 5 contain example performance evaluation results comparing timer-based state transitions with priority-based state transitions.
Figure 5:
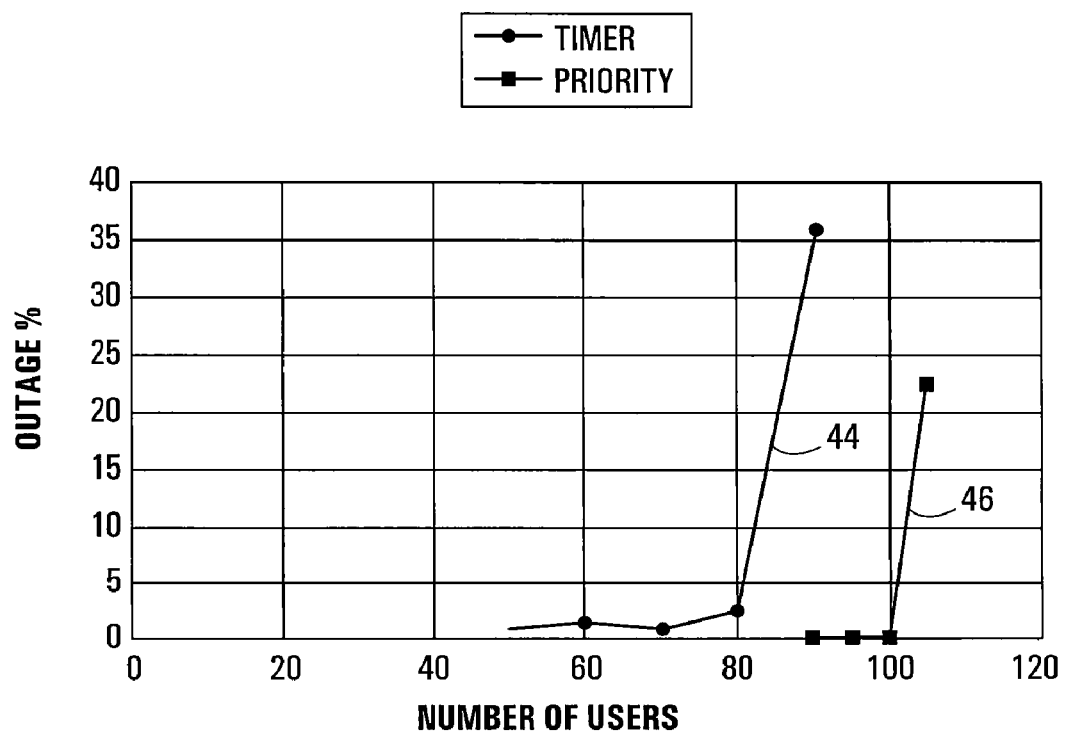

FIGS. 4 and 5 show example performance evaluation results. In FIG. 4, the outage rate is shown for a 2-state system with mixed traffic without video. In this example the traffic mix is 27.1% HTTP, 62.6% WAP, and 10.3% FTP. Performance results are shown at curve 40 for timer-based state transitions, and at curve 42 for priority-based state transitions. The horizontal axis is the number of users. It can be seen that for the same outage rate, the priority-based state transition scheduling can support a larger number of users. For example for an outage rate of 20%, approximately 80 users can be supported in the priority-based scheduling scheme, where only about 55 can be supported in the timer-based system.

Table 1 below shows further results for this same performance evaluation example. Table 1 shows the sector throughput, system capacity, and the respective gains in these two parameters when switching from the timer-based state transition to the priority-based state transition. The system capacity for this example consists of the numbers of users supported with an outage rate of 2%.

TABLE 1

| | 2-state | | | |
|---|---|---|---|---|
| MAC config-uration | Sector throughput (kb/s) | Gain in throughput | System Capacity (# of users) | Gain in system capacity |
| Timer/FIFO based state transition | 940 | — | 36 | — |
| Priority-based state transition | 952 | 1.3% | 60 | 67% |

FIG. 5 shows similar results for the 3-state example. Curve 44 shows the outage rate for the timer-based state transition system, and curve 46 results for the timer-based approach. Again, it can be seen that for a given outage rate, a larger number of users can be supported using the timer-based approach. Once again, Table 2 is provided below showing further performance results.

TABLE 2

| MAC configuration | 3-states | | | |
|---|---|---|---|---|
| | Sector thrp (kb/s) | Gain in thrp | System capacity (# of users) | Gain in system capacity |
| Timer/FIFO based state transition | 957 | — | 70 | — |
| Priority-based state transition | 1021 | 6.7% | 100 | 43% |

DETAILED EXAMPLE OF THE STATE SCHEDULER IMPLEMENTATION

A detailed example of a state scheduler implementation will now be presented starting with an assumed packet scheduler design.

Packet Scheduler:

This example assumes that a proportional fairness packet scheduler with β set to 1.

The packet scheduler calculates a selected data rate $r_{selected\_i}$ for each user assuming all users' buffers are full based on the reported C/I from each user in active state and in control-hold state. The relationship between C/I and the selected data rate is typically not a linear one and may be implemented using a table look-up.

The packet scheduler calculates an average throughput $T_i$ for each user with full data buffer (buffer full indicator $B\_f_i=1$) based on:

$$T_i(k) = \alpha \cdot T_i(k-1); \text{ if user i was not selected at (k-1)th scheduling instant.} \quad \text{Eq (2-1)}$$

$$T_i(k) = \alpha \cdot T_i(k-1) + (1-\alpha) \cdot N_i(k-1); \text{ if the user was scheduled } N_i(k-1) \text{ bits at (k-1)th scheduling instant.} \quad \text{Eq. (2-2)}$$

where $$\alpha = 1 - \frac{1.25 \cdot 10^{-3}}{1.5}$$

The packet scheduler calculates the packet priority by $$P_i = \frac{r_{select\_i}}{(T_i)^\beta} \quad \text{Eq. (3)}$$

Figure 6:
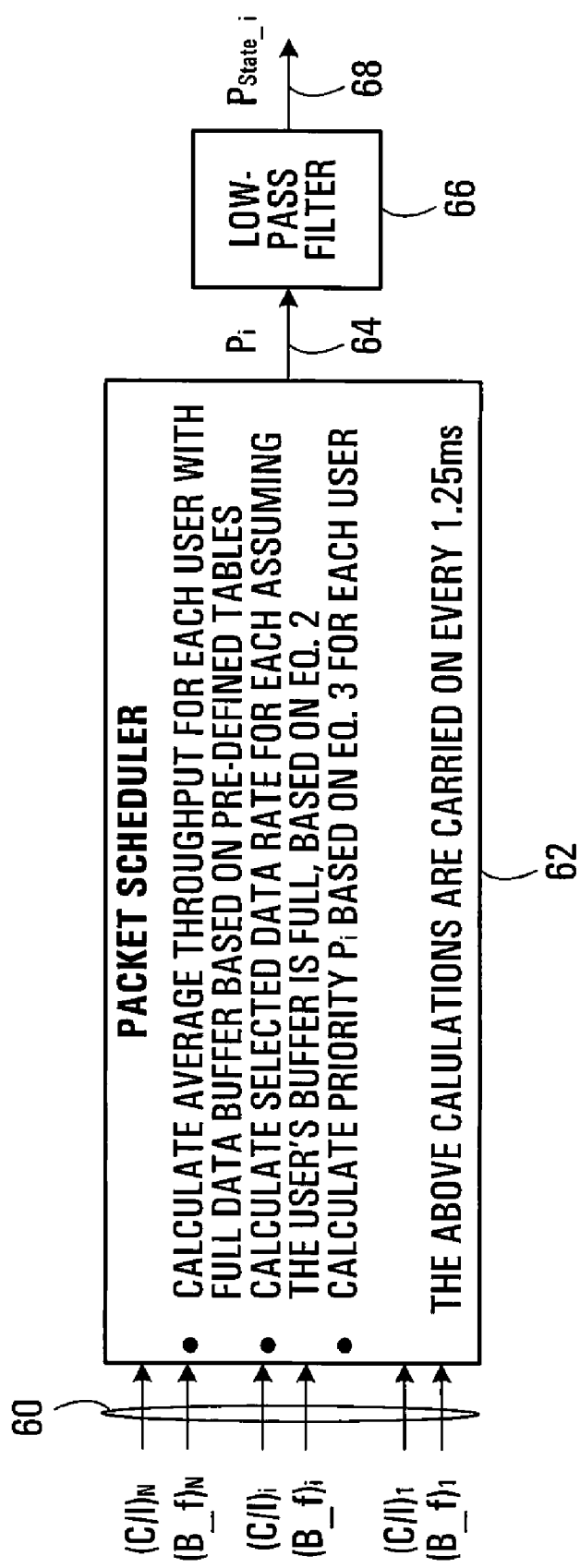
FIG. 6 is a block diagram of packet scheduled functionalities.

The operation of the packet scheduler for this example is summarized in FIG. 6. The input generally indicated 60 by to the scheduler 62 consists of the C/I readings for the users, and B_f indicators for all the users. The selected data rate is determined for each user, for example based on predefined tables. The average throughput is calculated as above, and the priority is also calculated above and output, as indicated at 64. These calculations might for example take place every 1.25 ms. These priorities 64 are then low-pass filtered by the state scheduler with low-pass filter 66 to generate the state priorities, $P_{state\_i}$ for active users. The packet scheduler may also calculate priorities $P_i$ for Control-Hold users and filter these to generate $P_{state\_i}$. Only active users are ranked for packet scheduling. It is not important where the various priorities are generated.

State Scheduler

As indicated above, the state scheduler (or packet scheduler) filters the packet priority to acquire the state priority. The state scheduler also generates state priorities for dormant users, preferably using the same mechanism as was used for active users, although not all the information may be available. C/I is not typically available for a dormant user for example and might be assumed to be some constant value, for example 0 dB.

Figure 7:
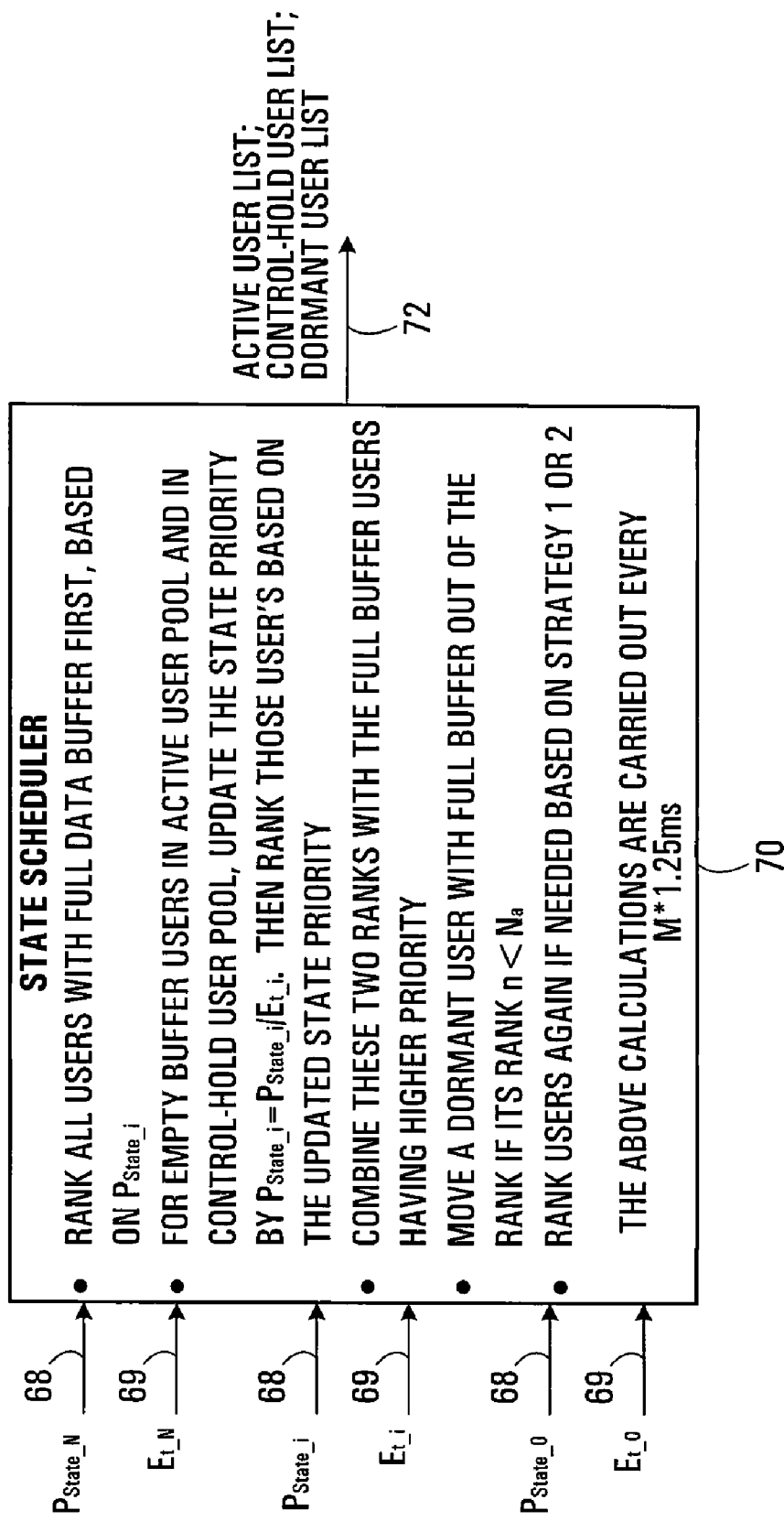
FIG. 7 is a block diagram of state scheduler functionality.

The operation of the state scheduler will be described with reference to FIG. 7. The inputs to the state scheduler 70 consist of the state priorities, $P_{state\_i}$ 68 and buffer empty time periods $E_{t\_i}$, and the output consists of an active user list, control-hold user list and dormant user list.

At the state update instant:

a) The state scheduler ranks all full buffer users based on their state priority—this includes all users in active state, control-hold state and dormant state with full buffer;

b) For all empty buffer users in active state and in control-hold state, the state priority is modified by $P_{state\_i} = P_{state\_i}/E_{t\_i}$, where $E_{t\_i}$ is the buffer empty time period of user i. The state scheduler ranks those users based on the modified state priority;

c) Dormant users with empty buffer are not ranked;

d) The two ranks are then combined with the users with full buffer having higher priority.

In some embodiments, the ranking thus determined is used as is to generate the Active, Control-hold and Dormant user groups, simply by taking the top Na users for Active, the next Nc users for control-hold, and the remaining users for Dormant.

In some embodiments, one or more constraints are imposed on which state transitions are allowed to occur, and these constraints are used to adjust the rankings prior to generating the user groups.

In some embodiments, the rule that a dormant user with full buffer is not allowed to be moved to control-hold state is followed. For example, a previously dormant user with full buffer may be moved out of the ranking altogether if its rank places it in the control-hold group.

The state scheduling process is performed less frequently than the packet scheduling, and might be carried out every M×1.25 ms for example, where M is an integer >1. In one embodiment, M is 100.

Ranking Strategy 1

Figure 8:
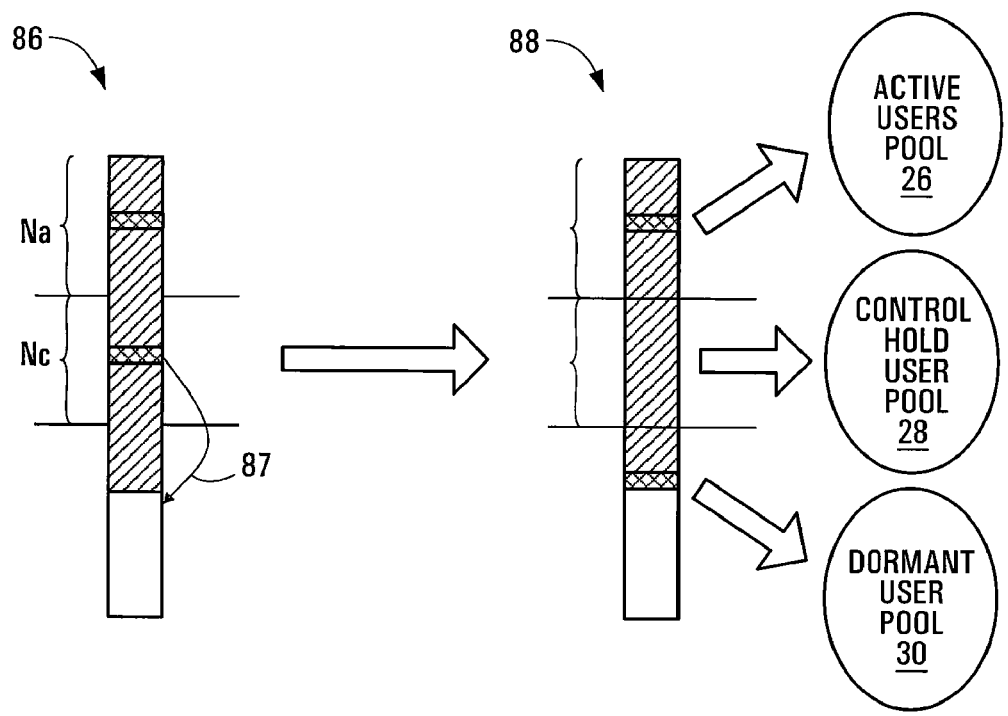
FIG. 8 is an illustrative example of a first ranking strategy.

In this ranking strategy, a full buffer user in active state or in control-hold state is allowed to be moved to the dormant state. This strategy will be described with reference to FIG. 8.

Generally indicated at 86 is the ranking of users based solely according to state priority. This includes a top most ranked set of Na users, the next highest rank set of Nc users and the remaining users. Each users previous state is indicated by an appropriate shading. Generally indicated at 80 are the users that were previously in the active state or control-hold state and have a full data buffer. Generally indicated at 82 are users with an empty data buffer. Finally, generally indicated at 84 are users previously in the dormant state that have a full buffer. It can be seen in this example that the top Na users include one dormant user with a full buffer, and the next Nc users include one dormant user with a full buffer.

With this ranking strategy, dormant users are not allowed to move from dormant state into control-hold state, but are allowed to move into active state. As such, any dormant users that are initially ranked to put them in the control-hold state are removed from the ranking. This is indicated symbolically by arrow 87 which shows a dormant user with full buffer being moved from the group of Nc users down to the bottom group. Generally indicated at 88 is the ranking after this re-organization has taken place. The user that was formerly in the group Nc users that was previously in dormant state has been moved down to the bottom, and one of the users which formerly fell outside of the group of users ranked in the top Na+Nc has now been moved into the control-hold user ranking range.

Ranking Strategy 2

Figure 9:
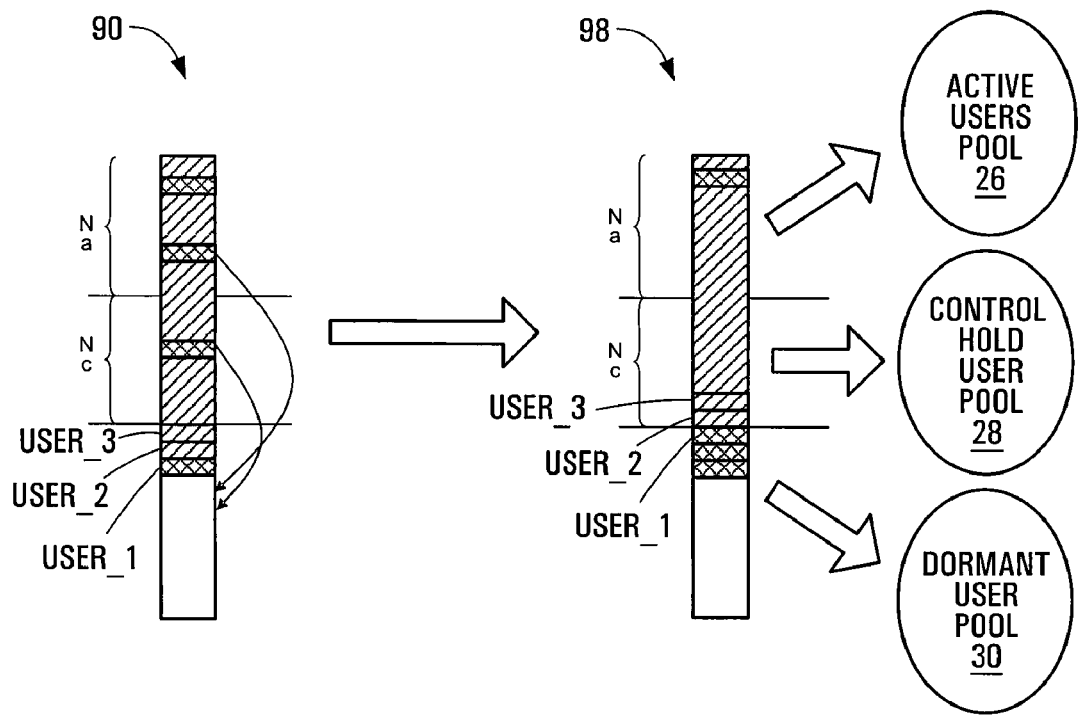
FIG. 9 is an illustrative example of a second ranking strategy.

In this ranking strategy, a full buffer user in active state or in control-hold state is not allowed to be moved to dormant. This strategy will be described with reference to FIG. 9.

In this example, the ranking based on state priority is generally indicated by 90. The users in active or control-hold state with full data buffer are indicated at 92, users in dormant state with full data buffer are indicated at 94, and users with an empty data buffer are indicated at 96.

It can be seen that after the initial ranking, the top Na users include users in the active or control-hold state with full buffer, and include two users in dormant state with full buffer. The next Nc highest ranked users include active or control-hold users with full buffer, and include a user in the dormant state with full data buffer. The users ranked below Na+Nc include two users previously in the active state with full data buffer, indicated at user_3, user_2 respectively, and include one user, user_1, in the dormant state with full data buffer.

In this ranking strategy, as before users which would be moved from dormant to control-hold state are removed off the ranking. Thus the user in dormant state ranked in the Nc users is moved out of that group off the ranking, or equivalently to the bottom. This leaves one space for an active user that was not previously in the top Na+Nc users to move into the group of Nc. However, after this takes place there is still one user, user_2, which is ranked outside the top Na+Nc, and this ranking strategy does not allow this. As such, the lowest ranked dormant user which remains in the top Na is moved off the ranking to the bottom and the remaining users are bumped up accordingly. This provides room in the group Nc for the remaining active user, user_2. The arrangement of rankings after such an arrangement is indicated generally at 98.

Priority Plus Threshold Algorithm

In order to decrease the possibility of moving an active user or control-hold user to dormant state during a packet call (e.g., a HTTP page download), the buffer empty time threshold can be used. It means that a user with an empty buffer is not moved to dormant if its buffer empty time is not larger than the pre-defined threshold. Such a user can still be viewed as a virtual full buffer user. Therefore the ranking strategy 2 can be employed.

As indicated previously, messaging is employed to instruct mobile stations to move between the various states. While a user is in active or control-hold state, a channel has been set up, and a base station can communicate directly with the mobile station to instruct an appropriate state transition to occur. On the other hand, when a mobile station is in the dormant state, there is no such channel available, and a broadcast type channel suggests a paging channel would typically be employed. Also, in a multi-base station environment, it is preferred to keep all base stations that are communicating with the mobile station up to date on the state of the mobile station.

The State scheduler is preferably implemented in the BTS. However the BSC should be updated with all user's state. The indication of state transitions to a mobile by a BTS is via over-the-air messages and the communication between BTSs and BSC is through internal signaling. A dormant user associated with a BTS is a user who is currently monitoring the paging/broadcast channel of this BTS. This is known by receiving a resource request from this dormant user or receiving the user's response to a page by this BTS.

Figure 10:
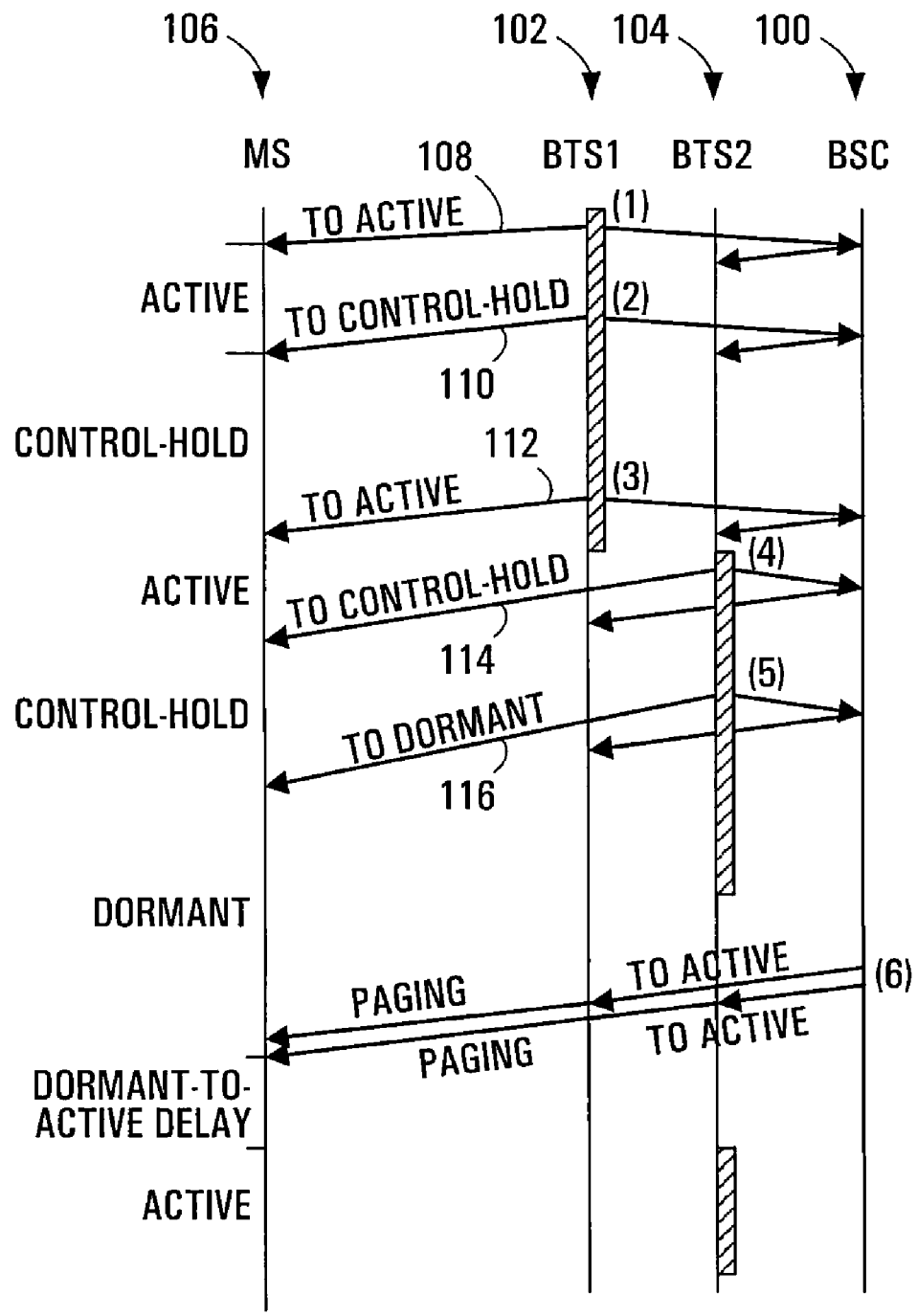
FIG. 10 is an example messaging sequence for instructing a mobile station to move between various states.
Figure 2:
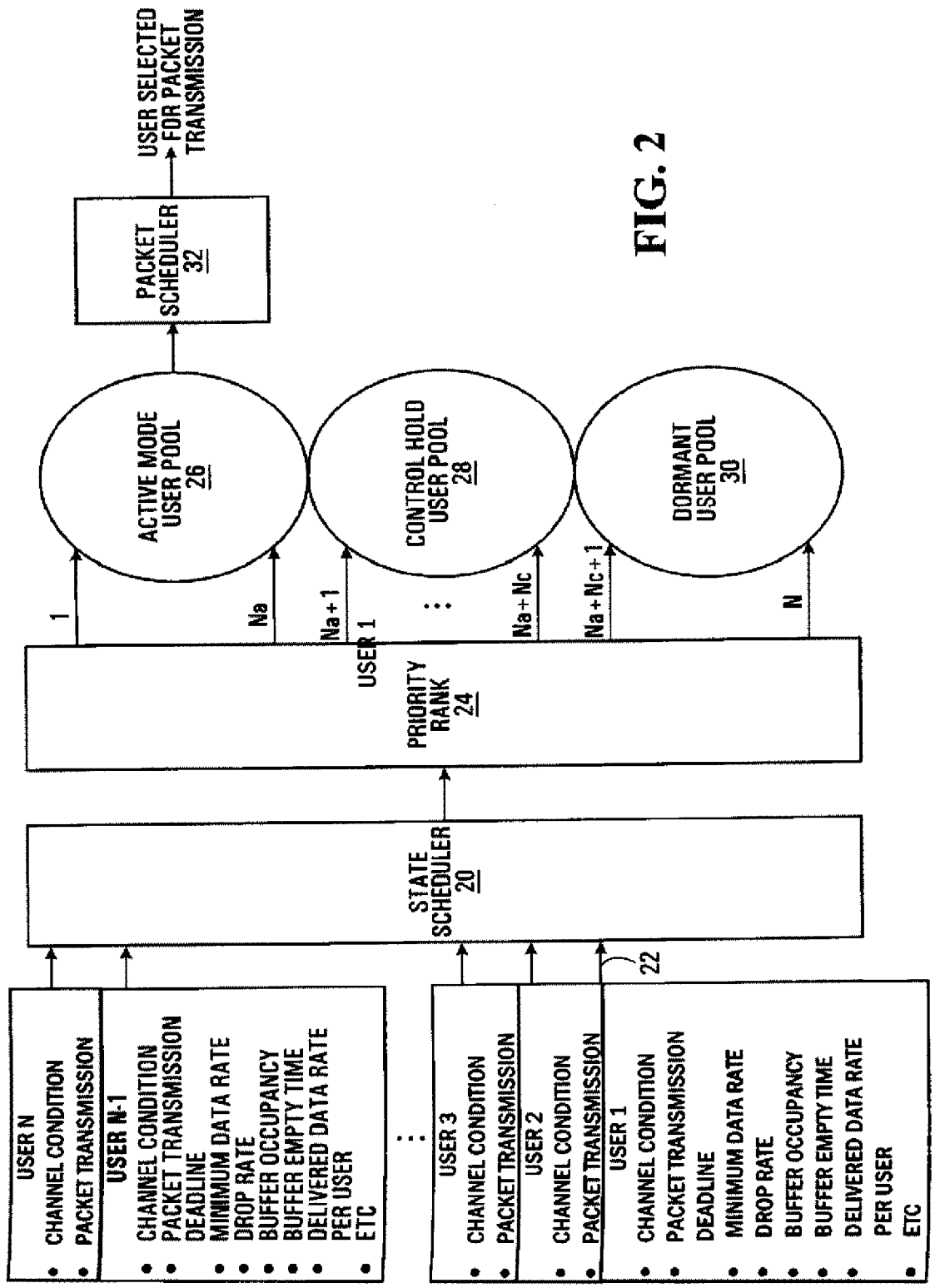
Figure 6:
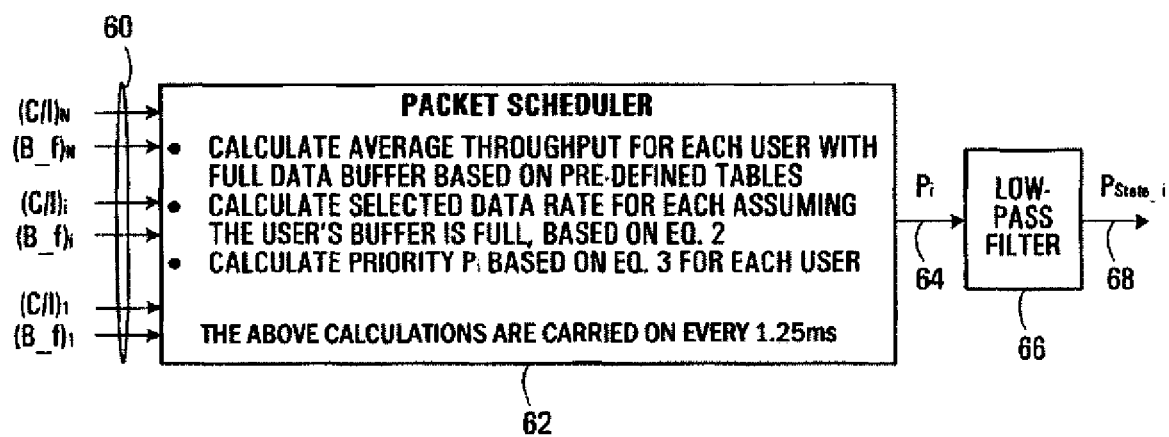

A symbol example of how messaging might take place is shown in FIG. 10 where it is assumed that there is a base station controller 100, a first base station BTS1 102, and a second base station BTS2 104 communicating with a mobile station MS 106. This scenario begins with BTS1 102 instructing mobile station 106 to move into the active state with message 108. BTS1 102 also informs the base station controller 100 which in turn informs any base stations including BTS2 104 of the state change. Next BTS1 102 instructs the mobile station 106 to transition to the control-hold state as indicated at message 110. This message is also conveyed through to the base station controller 100 and BTS2 104 as before. Next, BTS1 102 moves the mobile station 106 back into the active state as indicated by message 112. Once again the BSC 100 and BTS2 104 are updated. Next, it is assumed that a handoff takes place between BTS1 102 and BTS2 104 and as such the next message comes from BTS2 104 instructing the mobile station 106 to move into the control-hold state. The ranking of a user might change when it moves from a first base station such as BTS1 102 to a second base station such as BTS2 104 and this may result in such a state transition. Now, BTS2 104 sends messages to update the BSC 100 which in turn updates BTS1 102. The next step in the scenario has BTS2 104 sending a message to the mobile station 106 generally indicated at 116 instructing the user to go into the dormant state. Again, BSC 100 and the BTS2 104 are updated. Now the user is in dormant state and there is no active channel from either of BTS1 or BTS2 to send state transition messages. Thus, when it then becomes time to move the user back into the dormant state, the BSC 100 initiates the messaging by instructing both BTS1 102 and BTS2 104 to generate paging messages to the user instructing it to move into the active state. After a delay, the user does go back into the active state. It should be understood that this is a very specific example provided solely for the purpose of illustration, and that any sequence of state transitions is typically possible subject to any constraints which might be imposed upon the system. For example, the state transition from dormant to control-hold is not allowed in some scenarios. There may be more than two base stations involved at a given time or there may be only one involved at a given time in which case there is no updating of other base stations. Furthermore, some systems may not require a separate base station controller.

Numerous modifications and variations of the present invention are possible in light of the above teachings. It is therefore to be understood that within the scope of the appended claims, the invention may be practised otherwise than as specifically described herein.

The invention claimed is:

1. A method of transitioning a plurality of wireless devices between a plurality of states having increasing resource intensity from a least resource intensive state to a most resource intensive second state comprising:

ranking all power-on wireless devices from highest priority to lowest priority;

assigning a respective subset of the power-on wireless devices to each state based on the ranking of all power-on wireless devices, such that the priorities of power-on wireless devices of the subset assigned to a more resource intensive state of the plurality of states are higher than the priorities of power-on wireless devices of a subset assigned to a less resource intensive state of the plurality of states; and signalling to the wireless devices to instruct them to implement any change in state,
wherein ranking all power-on wireless devices comprises:
determining a state priority for each of the power-on wireless devices, the state priority for at least one of the plurality of devices being determined as a function of packet priority information;
ranking each of the power-on wireless devices based on the state priority of the devices and occupancy of a buffer of the devices, wherein regardless of the state priority, devices with a full buffer are ranked higher than devices with an empty buffer.

2. A method according to claim 1 wherein the states are MAC (media access control) states.

3. A method according to claim 2 wherein the MAC states comprise, in increasing order of resource intensity, Dormant, Control-Hold, and Active.

4. A method according to claim 3 wherein a respective predetermined maximum number of wireless devices are allowed to be in the Control-Hold and Active MAC states, and wherein the subsets are defined subject to these respective predetermined maximum numbers.

5. A method according to claim 2 wherein a respective predetermined maximum number of wireless devices are allowed to be in at least one of the MAC states, and wherein the subsets are defined subject to these respective predetermined maximum numbers.

6. A method according to claim 2 further comprising:
transmitting a shared channel to the wireless devices on an ongoing basis, scheduling wireless devices in the most resource intensive MAC state on a time division basis access to the shared channel.

7. A method according to claim 6 further comprising:
scheduling wireless devices by ranking all wireless devices in the most resource intensive MAC state, and at a given scheduling period scheduling the wireless device which is ranked highest.

8. A method according to claim 7 wherein the ranking performed in scheduling wireless devices is substantially similar to the ranking performed in assigning MAC states.

9. A method according to claim 8 wherein the ranking performed in scheduling wireless devices is substantially similar to the ranking performed in assigning MAC states in that short term parameters are used to determine rankings for scheduling, and corresponding long term parameters are used to determine rankings for assigning MAC states.

10. A method according to claim 2 further comprising:
prior to assigning a respective subset of the power-on wireless devices to each MAC state, applying at least one constraint to re-organize the rankings.

11. A method according to claim 10 wherein applying at least one constraint to re-organize the rankings comprises defining at least one state transition from a previous state to a new state which is not allowed to occur, and re-organizing the rankings to eliminate any such state transitions.

12. A method according to claim 11 wherein the MAC states comprise, in increasing order of resource intensity, Dormant, Control-Hold, and Active, and the at least one state transition which is not allowed to occur is from dormant to control-hold.

13. A method according to claim 12 wherein the MAC states comprise, in increasing order of resource intensity, Dormant, Control-Hold, and Active, and the at least one state transition which is not allowed to occur is from Active to Dormant for an active wireless device with a full buffer and from Control-Hold to Dormant for a Control-Hold device with a full buffer.

14. A method according to claim 13 further comprising:
for the purpose of state scheduling, treating a wireless device in the Active state or the Control-Hold state having a buffer empty time less than a buffer empty time threshold or satisfying some other constraint as though the wireless device had a full buffer.

15. An apparatus adapted to control transitioning a plurality of wireless devices between a plurality of states having increasing resource intensity from a least resource intensive state to a most resource intensive second state comprising:
a state scheduler adapted to:
a) rank all power-on wireless devices from highest priority to lowest priority;
b) assign a respective subset of the power-on wireless devices to each state based on the ranking of all power-on wireless devices, such that the priorities of power-on wireless devices of the subset assigned to a more resource intensive state of the plurality of states are higher than the priorities of power-on wireless devices of a subset assigned to a less resource intensive state of the plurality of states; and
c) signal to the wireless devices to instruct them to implement any change in state,
wherein the state scheduler adapted to rank all power-on wireless devices comprises:
the state scheduler adapted to determine a state priority for each of the power-on wireless devices, the state priority for at least one of the plurality of devices being determined as a function of packet priority information;
the state scheduler adapted to rank each of the power-on wireless devices based on the state priority of the devices and occupancy of a buffer of the devices, wherein regardless of the state priority, devices with a full buffer are ranked higher than devices with an empty buffer.

16. An apparatus according to claim 15 wherein the states are MAC (media access control) states, the apparatus further comprising:
transmit circuitry adapted to transmit a shared channel to the wireless devices on an ongoing basis; and
a packet scheduler adapted to schedule wireless devices in the most resource intensive MAC state on a time division basis access to the shared channel;
wherein the scheduler schedules wireless devices by ranking all wireless devices in the most resource intensive MAC state, and at a given scheduling period schedules the wireless device which is ranked highest;
wherein the ranking performed by the packet scheduler is substantially similar to the ranking performed by the state scheduler.

17. An apparatus according to claim 15 wherein the states are MAC (media access control) states, the apparatus comprising a base station.

18. A non-transitory computer-readable medium having computer executable instructions stored thereon for execution by a computer processor, for, when executed transitioning a plurality of wireless devices between a plurality of states having increasing resource intensity from a least resource intensive state to a most resource intensive second state, the computer readable medium comprising:
computer executable instructions for ranking all power-on wireless devices from highest priority to lowest priority;
computer executable instructions for assigning a respective subset of the power-on wireless devices to each state based on the ranking of all power-on wireless devices, such that the priorities of power-on wireless devices of the subset assigned to a more resource intensive state of the plurality of states are higher than the priorities of power-on wireless devices of a subset assigned to a less resource intensive state of the plurality of states; and computer executable instructions for generating signalling messages to be transmitted to the wireless devices to instruct them to implement any change in state, wherein computer executable instructions for ranking all power-on wireless devices comprises:

computer executable instructions for determining a state priority for each of the power-on wireless devices, the state priority for at least one of the plurality of devices being determined as a function of packet priority information;

computer executable instructions for ranking each of the power-on wireless devices based on the state priority of the devices and occupancy of a buffer of the devices, wherein regardless of the state priority, devices with a full buffer are ranked higher than devices with an empty buffer.

* * * * *

UNITED STATES PATENT AND TRADEMARK OFFICE
CERTIFICATE OF CORRECTION

| | | |
|---|---|---|
| PATENT NO. | : 7,965,668 B2 | Page 1 of 1 |
| APPLICATION NO. | : 12/243501 | |
| DATED | : June 21, 2011 | |
| INVENTOR(S) | : Zhang et al. | |

It is certified that error appears in the above-identified patent and that said Letters Patent is hereby corrected as shown below:

On the Face Page, in the Figure, delete " ~~PACKET TRANSMISSION~~ " and insert
-- PACKET TRANSMISSION --, therefor at each occurrence throughout the figure.

In Fig 2, Sheet 2 of 9, delete " ~~PACKET TRANSMISSION~~ " and insert -- PACKET TRANSMISSION --, therefor at each occurrence throughout the figure 2.

In Fig 6, Sheet 5 of 9, for Tag "62", in Line 7, delete "CALULATIONS" and insert -- CALCULATIONS --, therefor.

In Column 10, Line 21, delete " $E_{t,i}$ " and insert -- $E_{t-i}$ --, therefor.

Signed and Sealed this
Fourth Day of September, 2012

David J. Kappos
*Director of the United States Patent and Trademark Office*

UNITED STATES PATENT AND TRADEMARK OFFICE
CERTIFICATE OF CORRECTION

PATENT NO. : 7,965,668 B2  Page 1 of 3
APPLICATION NO. : 12/243501
DATED : June 21, 2011
INVENTOR(S) : Zhang et al.

It is certified that error appears in the above-identified patent and that said Letters Patent is hereby corrected as shown below:

On the Face Page, in the Figure, delete " ~~PACKET TRANSMISSION~~ " and insert
-- PACKET TRANSMISSION --, therefor at each occurrence throughout the figure.

In Fig 2, Sheet 2 of 9, delete " ~~PACKET TRANSMISSION~~ " and insert -- PACKET TRANSMISSION --,
therefor at each occurrence throughout the figure 2. (as shown on attached page)

In Fig 6, Sheet 5 of 9, for Tag "62", in Line 7, delete "CALULATIONS" and insert
-- CALCULATIONS --, therefor. (as shown on attached page)

In Column 10, Line 21, delete " $E_{t_i;i}$ " and insert -- $E_{t\_i'}$ --, therefor.

This certificate supersedes the Certificate of Correction issued September 4, 2012.

Signed and Sealed this
Second Day of October, 2012

David J. Kappos
*Director of the United States Patent and Trademark Office*